(12) United States Patent  
Shin

(10) Patent No.: US 6,965,579 B1  
(45) Date of Patent: Nov. 15, 2005

(54) COMMUNICATION SYSTEM AND METHOD FOR OPERATING MULTICAST SERVICE IN COMMUNICATION SYSTEM

(75) Inventor: Sang Rim Shin, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/520,363

(22) Filed: Mar. 7, 2000

(30) Foreign Application Priority Data

Mar. 8, 1999 (KR) .......................................... 1999/7478

(51) Int. Cl.[7] ................................................ H04J 3/24
(52) U.S. Cl. ...................................... 370/312; 370/432
(58) Field of Search ................................ 370/337, 347, 370/310, 329–338, 341, 431–469, 312, 328–9, 390; 455/403, 422, 66, 68, 556

(56) References Cited

U.S. PATENT DOCUMENTS

| | | | | |
|---|---|---|---|---|
| 5,825,752 A | * | 10/1998 | Fujimori et al. ............ | 370/260 |
| 5,943,343 A | * | 8/1999 | Hatta et al. ................. | 370/469 |
| 6,144,402 A | * | 11/2000 | Norsworthy et al. ........ | 725/109 |
| 6,157,649 A | * | 12/2000 | Peirce et al. ................ | 370/401 |
| 6,188,691 B1 | * | 2/2001 | Barkai et al. ............... | 370/390 |
| 6,279,029 B1 | * | 8/2001 | Sampat et al. .............. | 709/203 |
| 6,317,434 B1 | * | 11/2001 | Deng .......................... | 370/432 |
| 6,320,843 B1 | * | 11/2001 | Rydbeck et al. ............ | 370/207 |
| 6,331,983 B1 | * | 12/2001 | Haggerty et al. ........... | 370/400 |
| 6,434,117 B1 | * | 8/2002 | Momona ..................... | 370/236 |
| 6,498,936 B1 | * | 12/2002 | Raith .......................... | 455/466 |
| 6,577,618 B2 | * | 6/2003 | Diachina et al. ............ | 370/348 |

* cited by examiner

*Primary Examiner*—David Vincent  
(74) *Attorney, Agent, or Firm*—Fleshner & Kim, LLP

(57) ABSTRACT

In multicast service channels capable of efficiently transmitting multicast data and a method for efficiently managing multicast services using new multicast channels, a communication system includes: a higher layer; a first layer as a physical layer; and a second layer as an intermediate layer for processing data from the higher layer to generate multicast data and multicast control data, the second layer including at least one logical channel for transmitting the multicast data from the higher layer, at least first transmission channel for transmitting the processed multicast data to the physical layer, and at least one second transmission channel for transmitting the multicast control data to the physical layer.

38 Claims, 8 Drawing Sheets

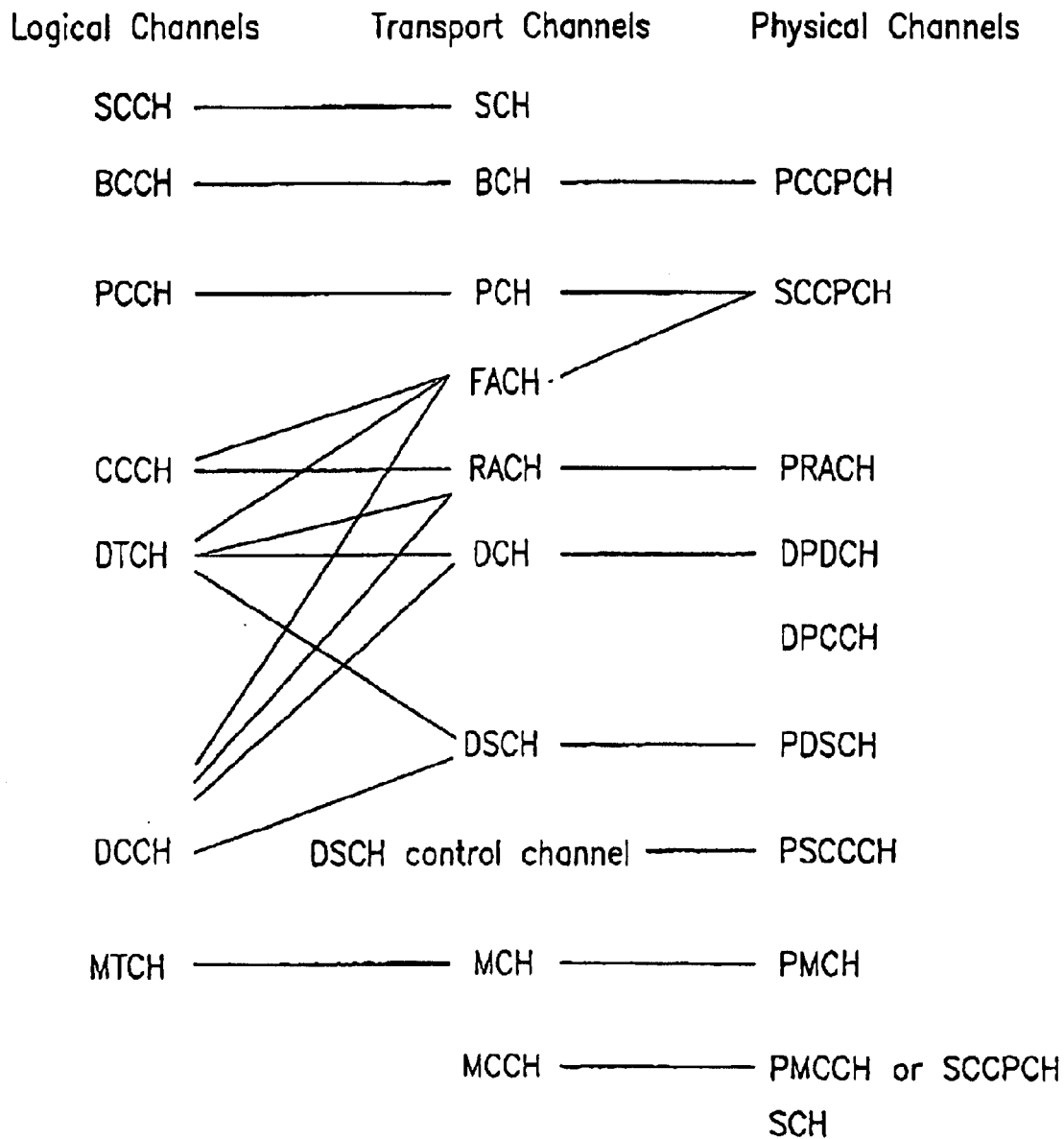

COMMUNICATION SYSTEM AND METHOD FOR OPERATING MULTICAST SERVICE IN COMMUNICATION SYSTEM

BACKGROUND OF THE INVENTION

1. Field of the Invention

The present invention relates to multicast service channels and a method for operating a multicast service using the channels.

2. Description of the Related Art

A multicast means a service mode in which one of subscribers accessed to a local area network (LAN) or Internet transmits information to specific subscribers and the specific subscribers propagates the same information to a plurality of subscribers in a bucket relay mode. Such a multicast service mode is distinguished from a single-cast service (or unicast) for providing information to a particular individual or a broadcast service (or group-call service) for providing information to an unspecified number of the general public.

A general packet radio service (GPRS) specification provides packet data services based on a related art global system for mobile communications (GSM) for providing multimedia services such as voices, images and data transmission. The GPRS specification defines the multicast service as follows.

The multicast service is a unidirectional point to multipoint (PTM) service in which a message (specific multicast data) is transmitted from a single source entity to a plurality of subscribers currently located within a geographical area. The message contains a group identifier indicating whether the message is of interest to all subscribers or to only a subset of subscribers belonging to a specific multicast group.

Multicast data transmission is performed within the specified delay, over one or more geographical areas as defined by the service requester. Repeated transmission is performed where applicable according to the schedule as defined/negotiated by the service requester. No knowledge of the instantaneous, actual "receive group" present within the given area at any point in time is available within the network.

The service request is changed depending on QOS (Quality of Service) and the size of the geographical area.

In the multicast service defined by the GPRS, neither authentication nor ciphering is performed. The multicast service receives multicast data anonymously without signalling for subscriber group identification or subscriber identification.

Meanwhile, the multicast service defined by the GPRS has been partially supplemented for universal mobile telecommunication system (UMTS) which is being developed by the European Telecommunication Standard Institute (ETSI).

The multicast service of the UMTS is distinguished from the multicast service defined by the related art GPRS in that authentication and ciphering are available. Also, the multicast service of the UMTS is distinguished from the multicast service of the GPRS in that signalling for subscriber group identification or subscriber identification is performed to receive the multicast data anonymously or in its name.

In addition, the multicast service of the UMTS is less susceptible to transmission delay that depends on the radio environment. Moreover, the multicast service of the UMTS has a variable data transmission rate. That is to say, small data can be transmitted at low speed while large data can be transmitted at high speed.

The multicast service provided by the UMTS includes distribution services such as news, weather and traffic reports, as well as product or service advertisements, multimedia services such as audio, video and data, on-demand based high quality audio services, on-demand based video stream line services, and remote downloading services.

To classify various multicast services as described above, the UMTS uses subscriber group identification, or international mobile group identifier (IMGI). The IMGI is described in detail in the GPRS.

In other words, the IMGI can be used to identify specific subscriber groups defined by the GPRS such as the PTM groups. In more detail, the PTM groups are identified by the IMGI which supports both a provider identification level and an application identification level. Furthermore, the IMGI can be used to authenticate an individual subscriber as well as the groups.

The aforementioned related art multicast services are provided in an idle mode. That is to say, the user entities (UE) can receive multicast data only if they are in the idle mode. The UTRAN in the network provides the multicast services to the user entity groups located within its service area in the idle mode.

In the idle mode, a radio link control (RLC) layer establishes a radio link on a logical channel provided from a medium access control (MAC) layer which is a lower level than the RLC.

Therefore, since the related art multicast service is provided in a state that the radio link is only established between the UE and the UTRAN, the logical channel has been suggested as a multicast channel for a multicast signal (or data) transmission.

In more detail, in the IDLE mode, a transmission channel for data transmission service to a physical layer is not provided. In this case, a physical channel for interfacing the data transmitted to the transmission channel on the air after setting a call is not assigned.

For this reason, it is provided that a transmission channel such as a dedicated channel (DCH) or a forward access channel (FACH) temporarily used for other purpose is mapped with the multicast channel. However, the DCH is used for a connected mode that identifies a data unit for a specific service and transmits the data transmission service to the data unit. Therefore, the DCH is not assigned in the IDLE mode which is the basis of the multicast service. Also, since the forward access channel (FACH) provides slow power control to an up-link channel as the case may be, it is impossible to satisfy advantages of the multicast service of the UMTS having a variable transmission rate depending on the amount of data.

Accordingly, to achieve various multicast services in the future, new channels are required to efficiently transmit the multicast data. Efficient management plans of the multicast services are also required.

SUMMARY OF THE INVENTION

Accordingly, the present invention is directed to multicast service channels and a method for operating multicast services using the channels that substantially obviate one or more of the problems due to limitations and disadvantages of the related art.

An object of the present invention is to provide multicast service channels capable of efficiently transmitting multicast data.

Another object of the present invention is to provide a method for efficiently operating multicast services using new multicast channels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a communication system according to the present invention includes: a higher layer; a first layer as a physical layer; and a second layer as an intermediate layer for processing data from the higher layer to generate multicast data and multicast control data, the second layer including at least one logical channel for transmitting the multicast data from the higher layer, at least first transmission channel for transmitting the processed multicast data to the physical layer, and at least one second transmission channel for transmitting the multicast control data to the physical layer.

In another aspect, a method for operating multicast services comprising the steps of: (a) requesting a network of multicast services through AS at a UE-NAS in an idle state without performing the multicast services; (b) transmitting corresponding data to the UE on a multicast channel and a multicast traffic channel for data transmission of the network and a multicast control channel for control data transmission when the multicast service request is successful achieved; (c) switching the idle state of the UE to a sleep release state for decoding the data transmitted from the network; and (d) switching the idle state of the UE to a sleep state for waiting for the data if there is no data transmitted from the network.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 12 is a diagram showing a mapping example between channels for multicast services according to the present invention.

DETAILED DESCRIPTION OF THE PREFERRED EMBODIMENTS

Reference will now be made in detail to the preferred embodiments of the present invention, examples of which are illustrated in the accompanying drawings.

An architecture of a communication system according to the present invention includes a UE, a UTRAN, and a core network (CN).

A radio interface for multicast services between the UE and the UTRAN is stacked with protocol layers of a higher layer, a radio resource control (RRC) layer, a radio link control (RLC) layer, a medium access control (MAC) layer, and a physical (PHY) layer. The PHY belongs to a first layer (Layer 1), the RLC and the MAC belong to a second layer (Layer 2), and the RRC belongs to a third layer (Layer 3).

Figure 1:
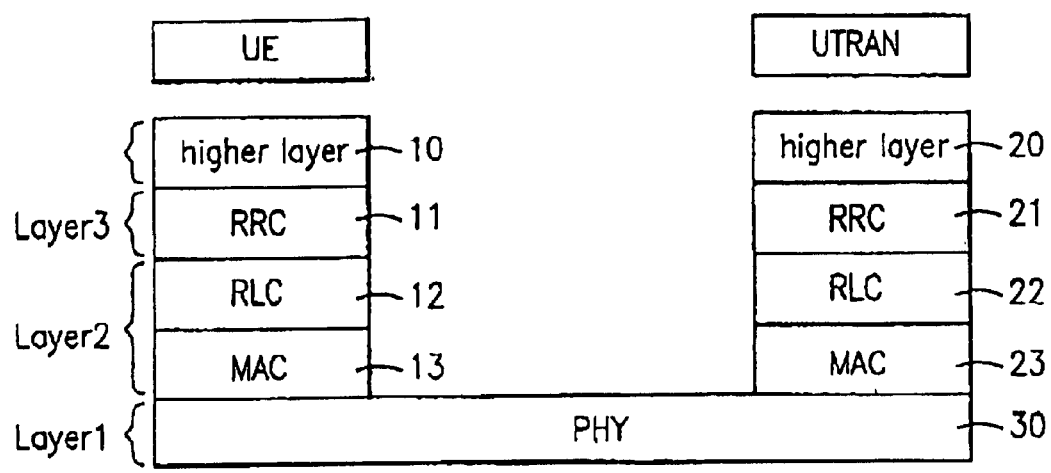
FIG. 1 shows a protocol stack structure of a radio interface for multicast services according to the present invention.

FIG. 1 shows a protocol stack structure of the radio interface for multicast services according to the present invention. As shown in FIG 1, higher layers 10 and 20 provide subscriber identification functions or subscriber group identification functions, and authentication and ciphering functions.

RRC layers 11 and 21 provide a variable transmission rate, and dynamic code usage and dynamic scheduling functions. RLC layers 12 and 22 provide unacknowledged multicast data transmission and multicast delivery functions. MAC layers 13 and 23 provide logical channels for various multicast services, multiplexing/demultiplexing functions between the logical channels and transmission channels which will be described later, and mapping functions. The MAC layers 13 and 23 also provide scheduling functions between the logical channels and support dynamic transmission rate changing functions using a transmission format combination set (TFCS). The PHY layer 30 supports a message transmission containing multicast data to a specific subscriber group, discontinuous transmission (DTX) and discontinuous reception (DRX) functions, and multicast data transmission with multi-code.

Particularly, the PHY layer provides different transmission channels to the MAC layer, and the MAC layer provides different logical channels to the RLC layer. The transmission channels are divided into common channels and dedicated channels depending on data transmission types, i.e., a common data transmission type or a dedicated data transmission type. The logical channels are divided into control channels and traffic channels depending on data characteristics, i.e., control data or user data.

In the present invention, to provide multicast services of high level, traffic channels (multicast traffic channel in the present invention) for multicast data transmission are used as logical channels. One or more transmission channels (multicast channels and multicast control channels in the present invention) provided to the MAC by the PHY are used to map with the traffic channels.

Furthermore, in the present invention, one or more physical channels (physical multicast channels in the present invention) are used to map with various transmission channels for multicast services.

The multicast service channels according to the present invention will be described in more detail.

The multicast traffic channels (MTCH) are used as logical channels provided to the RLC by the MAC for multicast data transmission. The MTCH is to serve unidirectional PTM services for providing specific multicast data such as multicast channels (logical channels) used in the existing GPRS to a plurality of subscribers located in the same area. Also, the MTCH is to transmit the multicast data information to specific groups subscribed to specific multicast services. In particular, each IMGI (G1, G2, G3, . . . , Gn-1, Gn) for subscriber identification is transmitted for multicast paging cycle. Thus, each UE receives corresponding multicast services depending on whether the specific multicast services are subscribed or not.

As aforementioned, in the present invention, it is remarkably noted that the MTCH is used as the logical channel. This is because that the MTCH is more suitable for the logical channel when considering characteristics of the logical channels based on the radio interface protocol structure defined by the existing GPRS.

Figure 2:
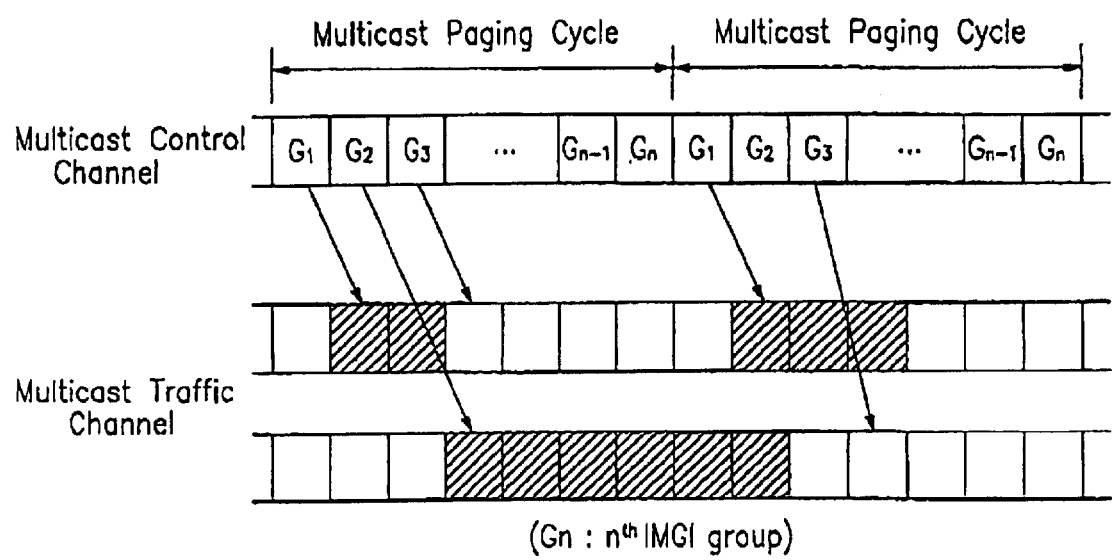
FIG. 2 is a diagram showing a multicast service scenario according to the present invention.

The MTCH is mapped with the multicast channel (MCH) of FIG. 2. The MCH is a transmission channel used only in a down-link together with the multicast control channel (MCCH) which will be described later.

FIG. 2 is a diagram showing a multicast service scenario according to the present invention.

Referring to FIG. 2, features of the transmission channels for multicast services are as follows.

First, the transmission channels are used in the down link, i.e., a link from UTRAN to UE.

Second, broadcasting is possible in all of service areas of a specific cell.

Third, a dynamic transmission rate is variable. For this reason, multiple different layers of multicast data will be transmitted, and some multicast data rate such as video can vary fast.

Fourth, it is possible to support a sleep mode. The UE receives multicast data during the idle mode. The UE extracts only particular multicast data from the multicast traffic channel, which is destined to the multicast group that the UE belongs to, rather than receiving other multicast data belonging to other multicast group. The UE gets into sleep mode while the transmission of other group multicast traffic is on-going. In order to achieve this sleep mode, UE has to be able to extract only selected data. The multicast control channel will be used for this control. The details for the MCCH are described below.

Fifth, since the multicast service is a unidirectional PTM service for providing specific multicast data to a plurality of subscribers, the subscribers use a common radio link for receiving multicast data. Accordingly, no power control is required.

Sixth, the higher layer may or may not require multicast data to be transmitted in a reliable fashion. For this reason, reliable/unreliable data transmission is possible.

Seventh, signalling for group identification in a band is not required. This is to support a sleep mode.

The MCH is a transmission channel used to satisfy the above features. Multicast data of a plurality of MTCHs are transmitted on the MCH.

Each MTCH transmits the multicast data with each bearer capability. Different MCHs may have different quality of services such as coding, repetition time and interleaving depth, depending on the characteristics of the multicast data being carried.

Thus, in the present invention, various multicast services can be provided. In this case, scheduling or multiplexing between different MTCHs is needed.

Figure 3:
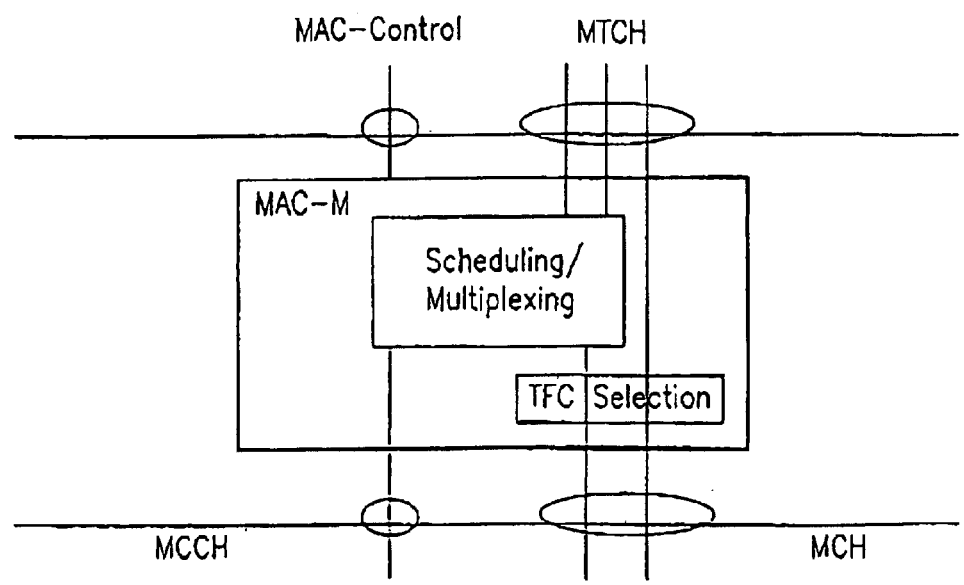
FIG. 3 is a diagram showing a MAC layer entity for multicast service according to the present invention.

FIG. 3 is a diagram showing a MAC layer entity for multicast services according to the present invention. Particularly, FIG. 3 shows scheduling or multiplexing among several MTCHs.

The multicast services of the present invention consider periodic multicast data transmission and non-periodic multicast data transmission.

In the case of multicast data transmission in periodic fashion, an exact IMGI value may not be required. In this case, the UE can know in advance or implicitly when the multicast data destined to the UE is being transmitted over the MTCH. Therefore, overhead due to the IMGI can be removed. However, this scheme provides no flexibility of the multicast data transmission in terms of data rate and period change, which may result in inefficient down link code usage.

On the other hand, for flexibility of multicast data transmission in terms of scheduling and code usage, it is possible for UTRAN to perform multicast data transmission in non-periodic fashion. However, in this case, the UE cannot change its mode to the sleep mode while other group multicast data is being transmitted since there is no way for UE to know when and which multicast group data is being transmitted. In other words, each UE has to decode all the data being transmitted together with the IMGI field, and filter the data defined to the UE somewhere in the higher layer such as Layer 2 or Layer 3.

The aforementioned two schemes of the periodic multicast data transmission and the non-periodic multicast data transmission have their own advantages but do not have optimal advantages.

Therefore, in the present invention, new transmission channels are used for optimal schemes capable of supporting flexibility and a sleep mode. The MCCHs are used as such transmission channels.

The MCCH is similar to the current paging channel in that it has a cycle, which is the period corresponding to the number of the IMGI groups. However, the MCCH contains the control information for the MCH. Accordingly, the UE can know when to decode the MCH based on the control information contained in the MCCH. The control information contained in the MCCH indicates that when the multicast data is transmitted, and how long the multicast data burst is.

The features of the MCCH for multicast services are as follows.

First, the MCCH is only used in the down link, i.e., a link from UTRAN to UE.

Second, broadcasting is possible in all of service areas of a specific cell.

Third, it is possible to support a sleep mode.

Fourth, since the multicast service is a unidirectional PTM service for providing specific multicast data to a plurality of subscribers, the subscribers use a common radio link for receiving multicast data. Accordingly, no MCCH is used to control power.

Fifth, the MCCH is a periodic channel.

In the present invention, by using the aforementioned MCCH and MCH, it is possible to support the sleep mode as shown in FIG. 2.

Particularly, the control information contained in the MCCH points the location and duration of the multicast data transmitted on the MCH.

The present invention using the periodic MCCH and non-periodic MCH provides the system for more dynamic radio resource management.

For multicast services, the users have to know configuration of the multicast services. To this end, some of the control information for the multicast services is transmitted on a broadcasting channel (BCH) and the other control information is transmitted on the MCCH.

To provide the next multicast services, the network transmits the control information such as code assignment information for MCH and frame assignment information for MCH on the MCCH.

The MCH is available in a multi-code mechanism. In this case, the code assignment information for MCH should be reported to the users and thus is transmitted to the users. The multicast data is also transmitted to successive frames on the MCH. At this time, frame assignment information for MCH is transmitted to the users to inform how many frames contain multicast data.

In addition to the control information transmitted on the MCCH, the control information for multicast services transmitted on the BCH will be described below.

The multicast services according to the present invention are limited by a geographical area. Such a geographical area means cells to which no multicast service is provided. Thus, the UE has to know whether or not its own cell currently provides multicast services. The control information therefor is transmitted on the BCH.

Different sets of multicast services are provided in different geographical areas. This means that available multicast service set may change depending on the cell or sector. Consequently, the UE can know which multicast services are available by decoding BCH.

Also, the BCH contains information indicative of configuration for MCCH. This is because that the network has to provide information on the MCCH to the subscribers. The information on the MCCH means information which code has been used for the MCCH or information such as cycles of the MCCH used when the subscribers receive the control information of the multicast services.

Finally, the BCH contains code usage information for MCH. This information is required when the multicast services use multi-code and is used when the multicast data is transmitted at high speed or the transmission rate thereof is variable.

In addition to the above channels, for multicast services, the physical layer uses a physical multicast channel (PMCH) as a physical channel mapped with the multicast channel (MCH).

The multicast service scenario according to the present invention will be described with reference to FIG. 2.

First, the multicast data receiving procedure will be described. It is assumed that the user knows the IMGI, time to check the MCCH based on an approval decided between the user and the network, and information for the MCCH from the BCH.

If the multicast services are available for the user, the user decodes only frames contained in the IMGI groups on the periodic MCCH. Then, the user decodes the multicast data transmitted on the MCH by using information for the MCCH, which indicates when the multicast data is transmitted and how long the multicast data is transmitted.

Afterwards, the user repeats decoding procedures for the MCCH and the MCH.

The transmission channel for the aforementioned multicast services, i.e., the physical channels mapped with the MCCH and the MCH will now be described with reference to FIG. 4.

The physical channel mapped with the MCH, i.e., the physical multicast channel (PMCH) has the following features.

The PMCH does not require field for power control. It is possible to flexibly change transmission rate of the multicast data. In other words, when the multicast data transmitted on the radio space has high transmission rate or low transmission rate, it is possible to appropriately change transmission rate. The multicast data transmitted on the MCH can be transmitted to the PMCH in a type of successive frames without the MCCH. Accordingly, for channel estimation, the PMCH requires at least one pilot bit. Since the data transmission rate of the MCH is variable per frame, the PMCH includes a transmission format combination indicator (TFCI) field. The PMCH can be transmitted using the multi-code structure as aforementioned. In this case, a necessary interleaving is performed per frame.

Meanwhile, the physical channel mapped with the MCCH, i.e., the physical multicast control channel (PMCCH) has a certain transmission rate and a cell characteristic. Also, no field for power control is required due to the aforementioned reason, in the same manner as the PMCH.

The PMCCH has a repeated cycle in the same manner as the paging channel, and the cycle is variable according to the service area. Information of the TFCI field can be inserted into the PMCH or the PMCCH depending on whether the transmission rate of the multicast data is variable at high speed or low speed. If the transmission rate of the multicast data is changed per frame, when TFCI field is contained in the PMCH having continuity. By contrast, if the transmission rate of the multicast data is not changed during the multicast paging cycle for the multicast data transmission, the TFCI field is contained in the PMCCH. However, as shown in FIG. 4, if the TFCI field is contained in the PMCH, a flexibility can be obtained.

Figure 4:
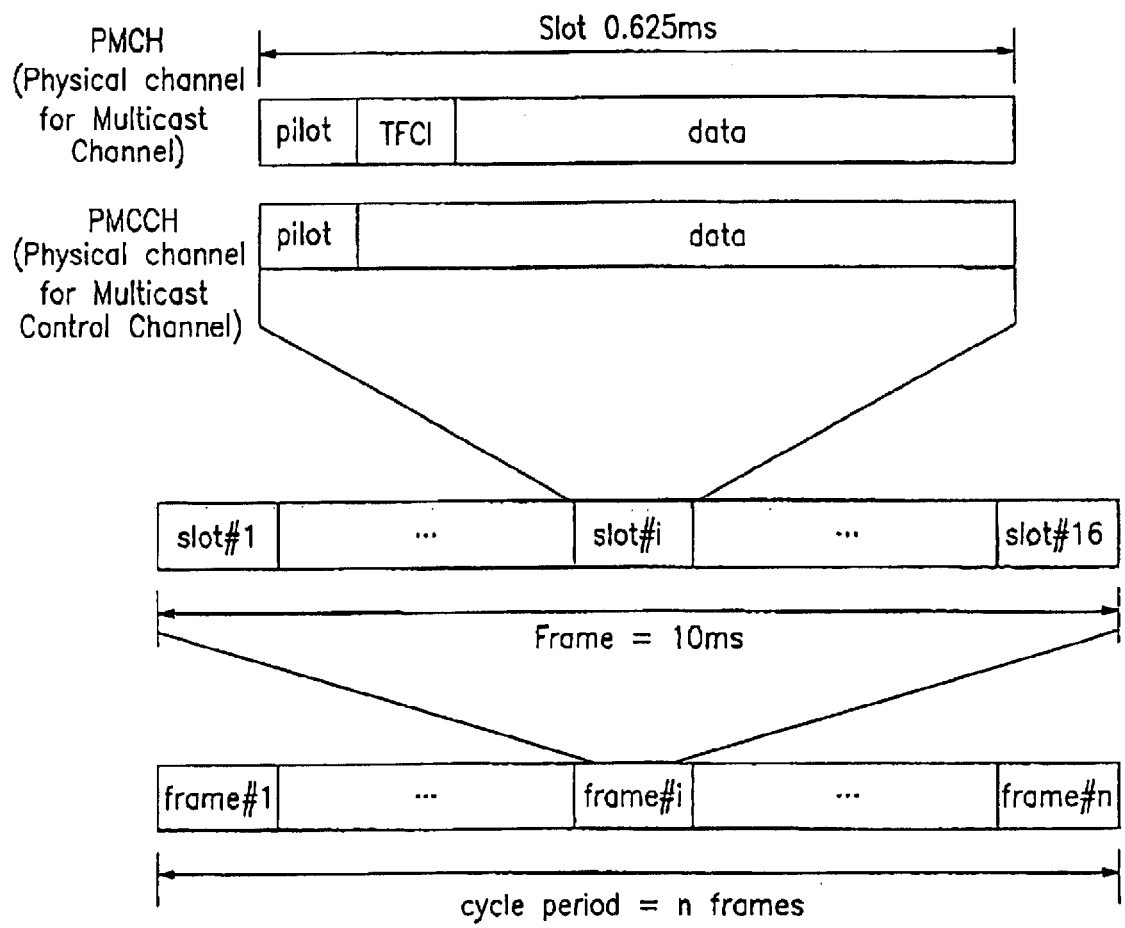
FIG. 4 is a diagram showing a physical channel structure for multicast service according to the present invention.

In FIG. 4, the PMCH and the PMCCH have been illustrated as different channels. However, one channel having a predetermined band my constitute the PMCH and the PMCCH. At this time, the one channel includes the TFCI field, a data field containing the multicast data and the multicast control data, and a pilot field, sequentially.

In this case, the communication system includes a higher layer, at least one logical channel for generating multicast data and multicast control data by processing data from the higher layer, an intermediate layer having at least one transmission channel for transmitting the multicast data and the multicast control data to a lower layer, and a physical layer having a single physical channel of a predetermined band, for processing the multicast data and the multicast control data in a predetermined data field type on the physical channel.

Consequently, the MCH is a down link channel commonly used by the various multicast groups for transmitting the multicast data. Meanwhile, the MCCH is a down link channel for providing control information for the MCH to all of the cells to effectively support the sleep mode processing of the user.

Figure 5:
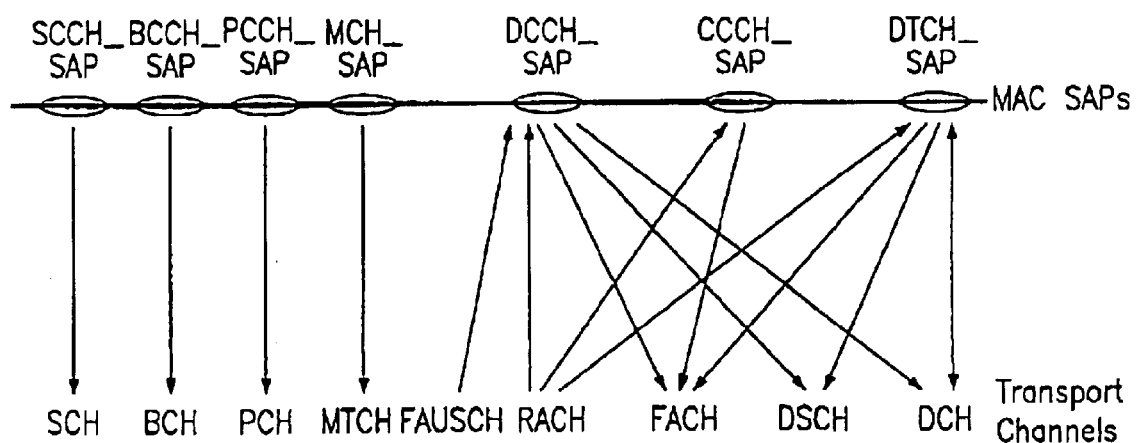
FIG. 5 is a diagram showing a mapping type between transmission channels and logical channels according to the present invention.

FIG. 5 is a diagram showing a mapping type between the transmission channels and the logical channels according to the present invention.

In FIG. 5, SCCH-SAP is downwardly mapped with SCH, BCCH-SAP is downwardly mapped with BCH, PCCH-SAP is downwardly mapped with PCH, MTCH-SAP is downwardly mapped with MCH, DCCH-SAP is upwardly or downwardly mapped with FAUSCH, RACH, FACH, DSCH, and DCH, CCCH-SAP is upwardly or downwardly mapped with RACH and FACH, and DTCH is upwardly or downwardly mapped with RACH, FACH, DSCH and DCH.

As shown in FIG. 5, the MAC includes a plurality of service access point (SAPs).

Figure 6:
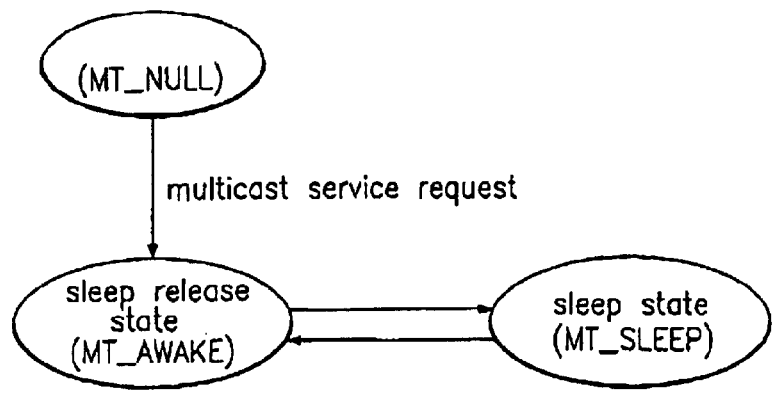
FIG. 6 is a diagram showing a state change of UE when performing multicast services according to the present invention.

FIG. 6 is a diagram showing state change of UE during multicast service according to the present invention.

The UE has an idle state MT_NULL, a sleep mode release state MT_AWAKE, and a sleep state MT_SLEEP. The idle state MT_NULL means that the multicast service is not performed. In this case, if the multicast service request is successfully performed by the user, the idle state MT_NULL becomes the sleep mode release state MT_AWAKE. In the sleep mode release state MT_AWAKE, the user UE decodes the multicast data on the MCCH or the MCH. IF no data received from the MCCH or the MCH exist, the user UE becomes the sleep state MT_SLEEP. The sleep state MT_SLEEP means that it waits for the multicast data on the MCCH or the MCH.

The method for operating the multicast service using the above channels according to the present invention will be described with reference to the accompanying drawings.

Figure 7:
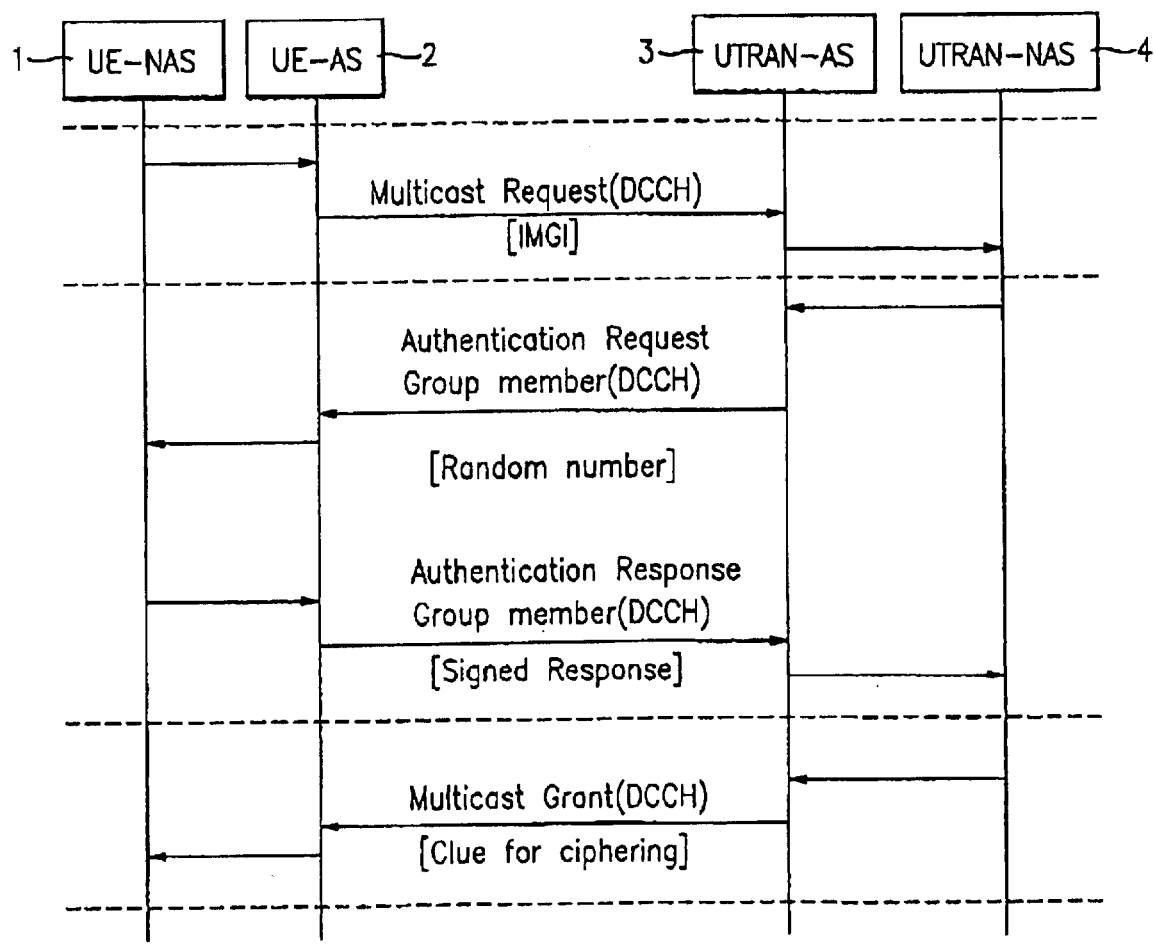
FIG. 7 is a diagram showing an example of multicast service setup procedures according to the present invention.

FIG. 7 is a diagram showing an example of the multicast service setup procedure according to the present invention.

First, a procedure for efficiently interfacing between non-access stratum (NAS) and access stratum (AS) will be described.

The NAS requests the multicast data transmission of the AS. Then, the AS transmits appropriate multicast data to the NAS. In the present invention, the multicast service operating procedure based on the interface procedure between the NAS and the AS is supposed.

In FIG. 7, the network includes a PHY as a first layer 1 (Layer 1), an RLC and a MAC as a second layer (Layer 2), an RRC as a third layer (Layer 3), and a higher layer, as described in FIG. 1.

In the radio interface protocol for the multicast service, the higher layer performs authentication and ciphering, and also supports signalling for subscriber identification or subscriber group identification.

The RRC flexibly changes data transmission rate and supports dynamic scheduling and code usage for the aforementioned channels.

Meanwhile, the MAC uses the aforementioned logical channels, and performs scheduling for the logical channels. The MAC also performs multiplexing and demultiplexing between the logical channels and the transmission channels, and supports dynamic data transmission rate.

The PHY supports transmission and reception of the multicast data and permits the multi-code to be transmitted to the user.

The multicast service procedure according to the present invention will be described based on the aforementioned radio interface protocol structure.

In FIG. 7, the user UE requests the network UTRAN of the multicast services.

The UTRAN transmits the multicast data to the user UE and the user UE receives the multicast data transmitted to the UTRAN. Thereafter, the user UE completely receives the requests multicast data and then informs the UTRAN of the multicast service release.

In more detail, the request for the multicast service is performed only when the user UE starts to receive the multicast data. When the user UE changes the service cell or the service area, the request for the multicast service should not be performed. In the above procedure, the UE obtains a ciphering key for decoding the multicast data.

Meanwhile, in FIG. 7, the UE-NAS 1 is unable to directly access the UTRAN, while the UE-AS 2 is able to directly access the UTRAN. The UE-AS 2 requests the UTRAN of the multicast services on the dedicated control channel (DCCH). At this time, the UE-AS 2 informs the UTRAN of its own IMGI. Then, the UTRAN requests the UE of authentication for subscriber group members. The UTRAN also requests the UE of authentification for the subscriber group members in a random number. Thus, when the UE-AS 2 responds to the request of the authentication from the UTRAN, the UTRAN acknowledges the multicast services. At this time, the UE-AS 2 receives a secure ciphering key for decoding the multicast data. For the above multicast service request procedures, the DCCH is used over the entire procedures.

Figure 8:
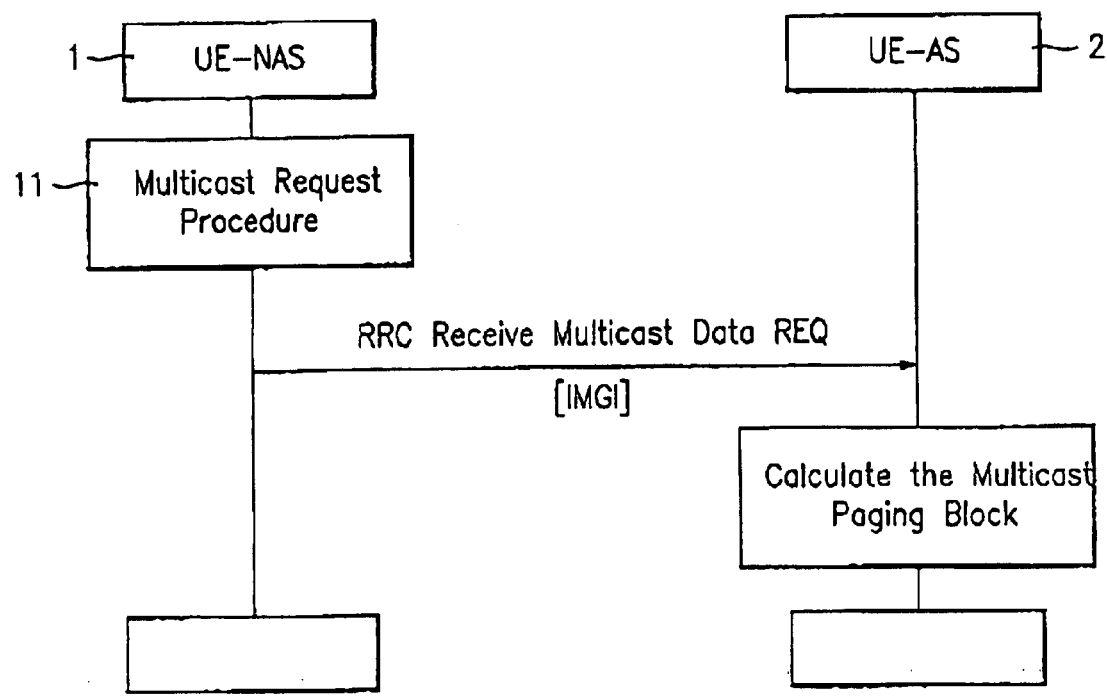
FIG. 8 is a diagram showing a multicast service request procedure according to the present invention.

The service request procedures in the UE-NAS 1 and the UE-AS 2 will be described with reference to FIG. 8.

The multicast service request between the UE-NAS 2 and the UE-AS 2 is performed in the RRC of FIG. 7. The UE-AS 2 receives the multicast service request from the UE-NAS 1. At this time, the UE-NAS 1 informs the UE-AS 2 of its own IMGI. Then, the UE-AS 2 calculates the multicast paging blocks and completes the service request arrangements to the UTRAN.

Figure 9:
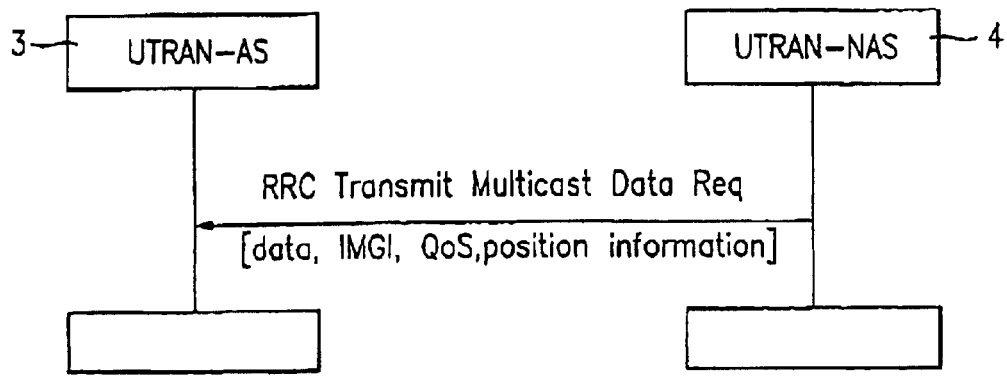
FIG. 9 is a diagram showing a multicast service transmission procedure according to the present invention.

FIG. 9 is a diagram showing multicast service transmission procedures according to the present invention.

First, the UTRAN-AS 3 receives the service request from the UE-AS 2 and informs the UTRAN-NAS 4 of it. The UTRA-NAS 4 transmits the requested multicast data, corresponding IMGI, and location information of corresponding UE to the UTRAN-AS 3. The UTRAN-NAS 4 provides information on the service quality such as coding, the repeated number of times and interleaving degree to the UTRAN-AS 3. This procedure is also performed in each RRC of the UTRAN-NAS 4 and the UTRAN-AS 3. As the requested multicast data, corresponding IMGI, location information of corresponding UE, and information on the service quality are transmitted to the UTRAN-AS 3, the UE-AS 2 reads the MTCH.

Figure 10:
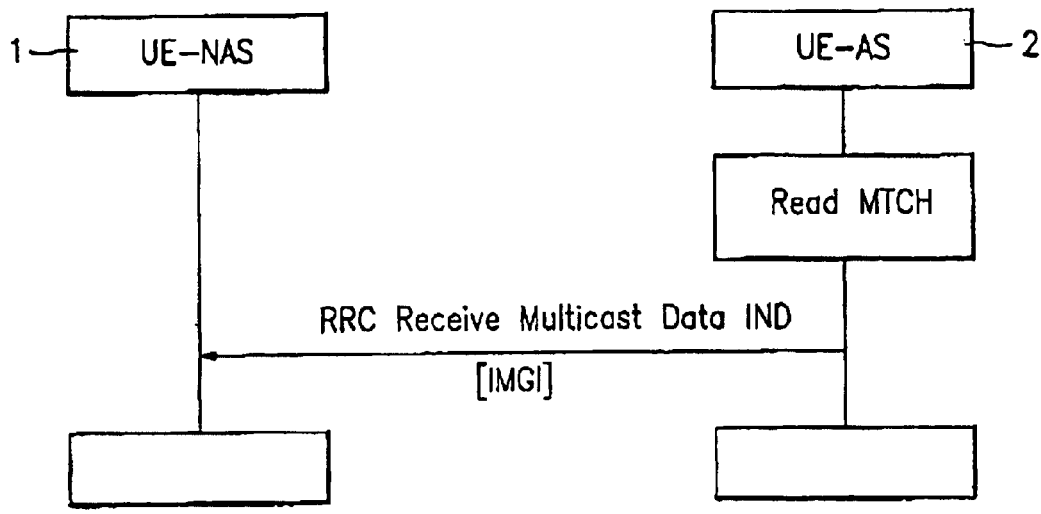
FIG. 10 is a diagram showing a multicast service reception procedure according to the present invention.

FIG. 10 is a diagram showing a multicast service reception procedure according to the present invention, and particularly the multicast service reception procedure in the user entity among the multicast service operating procedures. The UE-AS 2 reads the MTCH and then informs the UE-NAS 1 that the requested multicast data has been received.

Figure 11:
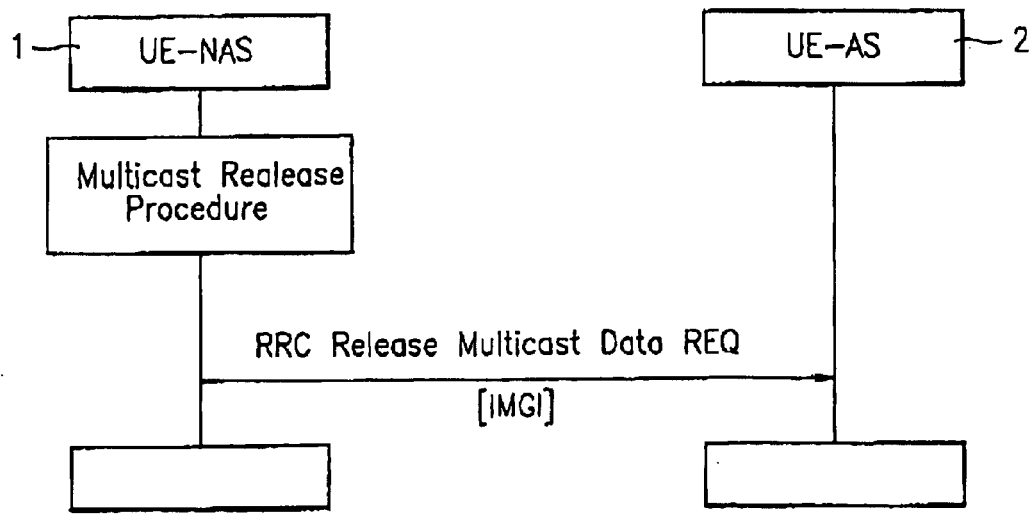
FIG. 11 is a diagram showing a multicast service release procedure according to the present invention.

FIG. 11 is a diagram showing a multicast service release procedure according to the present invention, and particularly the service release procedures in the user entity UE among the multicast service operating procedures. The multicast service release procedure is performed in such as manner that the UE-NAS 1 transmits the multicast service release request to the UE-AS 2. At this time, the UE-NAS 1 informs the UE-AS 2 of its own IMGI. This multicast service release procedure is also performed in the RRC of the UE-AS 2.

FIG. 12 is a diagram showing a mapping example between channels for multicast services according to the present invention.

In FIG. 12, in case that the MCH is used as the transmission channel, the PMCH is used as the physical channel. In case that the MCCH is used as the transmission channel, the PMCCH or a secondary common control physical channel (CCPCH) or SCH is used as the physical channel. In this case, the MTCH is a logical channel.

As aforementioned, the multicast channel and the method for operating multicast services using the channel have the following advantages.

Since the physical channel mapped with the new transmission channel is used, it is possible to flexibly support variable data transmission rate. It is also possible to support flexible scheduling and code usage for the channels. Therefore, the next generation multicast service can more efficiently be performed.

Furthermore, since the periodic MCCH and the non-periodic MCH are used as the transmission channels, more flexible communication system can be achieved in operating the radio resources.

Finally, in case that the subscriber receives actual multicast data through the multicast services, the multicast service passes through the sleep mode, thereby reducing power consumption.

It will be apparent to those skilled in the art that various modifications and variations can be made in the multicast channel and the method for operating a multicast service using the channel according to the present invention without departing from the spirit or scope of the invention. Thus, it is intended that the present invention covers the modifications and variations of the invention provided they come within the scope of the appended claims and their equivalents.

What is claimed is:

1. A communication device comprising:

a physical layer;

a medium access control (MAC) layer; and a radio link control (RLC) layer, wherein the MAC layer receives multicast data from the RLC layer through a prescribed number of multicast data channels and receives multicast control data from the RLC through at least one logical control channel, the prescribed number being based on a number of multicast services within a geographical area, and an output of the MAC layer corresponding to the multicast control data and the multicast data being provided to the physical layer through at least one transport channel.

2. The communication device of claim 1, wherein multicast control data comprises a plurality of frames, and there is a prescribed relationship between the frames and the multicast data channels.

3. The communication device of claim 2, wherein there is a one-to-one relationship between each frame and each multicast data channel.

4. The communication device of claim 2 or 3, wherein each frame provides control information for at least one corresponding multicast data channel.

5. The communication device of claim 4, wherein each frame is provided to at least one transport channel prior to providing the multicast data of the at least one corresponding multicast data channel.

6. The communication device of claim 5, wherein the control information provided on the at least one transport channel has a paging cycle based on the prescribed number of multicast services.

7. The communication device of claim 1, wherein the MAC layers includes an entity for performing at least one of scheduling and multiplexing.

8. The communication device of claim 7, wherein the entity further performs TFC selection.

9. The communication device of claim 1, wherein the geographic area is a coverage area of a cell.

10. The communication device of claim 1, wherein the number of multicast services is based on a number of specific groups subscribing to specific multicast services.

11. The communication device of claim 10, wherein each specific group is based on a subscriber group identification or international mobile group identity.

12. The communication device of claim 1 or 2, wherein the multicast data channels are multicast traffic channels.

13. The communication device of claim 12, wherein the multicast traffic channels are logical channels.

14. The communication device of claim 1, further comprising a radio resource control (RRC) layer which is an upper layer of the RLC layer.

15. The communication device of claim 14, where in the RRC layer provides at least one of variable transmission rate function, dynamic code usage function and dynamic scheduling functions.

16. The communication device of claim 1, wherein the RLC layer provides at least one of unacknowledged multicast data transmission function and multicast delivery function.

17. The communication device of claim 1, wherein the physical layer supports at least one of a message transmission containing the multicast data, discontinuous transmission functions, discontinuous reception function and multicast data transmission with multi-code.

18. The communication device of claim 1, wherein the multicast data channels are used to serve point to multipoint (PTM) services.

19. The communication device of claim 18, wherein the PTM services are unidirectional.

20. The communication device of claim 1, wherein the communication device provides at least one of periodic multicast data transmission and non-periodic multicast transmission.

21. The communication device of claim 1, where in at least one transport channel supports paging.

22. The communication device of claim 21, wherein the paging has a paging cycle.

23. The communication device of claim 22, wherein the at least one transport channel is only used in the downlink.

24. The communication device of claim 1, wherein the at least one transport channel supports a sleep mode or an idle mode of a terminal.

25. The communication device of claim 1, wherein the at least one transport channel provides a code assignment information to be used by a terminal.

26. The communication device of claim 1, wherein the at least one transport channel is mapped to a physical channel.

27. The communication device of claim 1, wherein the physical channel comprises at least one of a physical multicast channel (PMCH) and physical multicast control channel (PMCCH), and the at least one transport channel is at least one of multicast channel (MCH) and multicast control channel (MCCH).

28. The communication device of claim 26, wherein the physical channel provides code usage information for at least one transport channel.

29. The communication device of claim 26, wherein the at least one transport channel does not use power control.

30. The communication device of claim 26, wherein the physical channel does not contain power control information.

31. The communication device of claim 26, where the physical channel uses at least one pilot bit.

32. The communication device of claim 26 or 31, wherein the physical channel includes a transport format combination indicator (TFCI).

33. The communication device of claim 26, wherein a frame of the physical channel is 10 ms and includes a prescribed number of slots.

34. The communication device of claim 33, wherein the prescribed number of slots is 16.

35. The communication device of claim 1, wherein at least one transport channel is a common downlink channel.

36. The communication device of claim 26, where the physical channel is a secondary common control physical channel (S—CCPCH).

37. The communication device of claim 1, wherein a terminal determines available multicast services from a channel containing cell-specific information.

38. The communication device of claim 37, wherein the channel is a broadcast channel.

* * * * *